(12) United States Patent
Kimura

(10) Patent No.: US 12,007,022 B2
(45) Date of Patent: Jun. 11, 2024

(54) ELECTRIC PARKING BRAKE DEVICE FOR VEHICLE

(71) Applicant: ISUZU MOTORS LIMITED, Tokyo (JP)

(72) Inventor: Yuho Kimura, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/546,629

(22) PCT Filed: Mar. 11, 2022

(86) PCT No.: PCT/JP2022/011052
§ 371 (c)(1),
(2) Date: Aug. 16, 2023

(87) PCT Pub. No.: WO2022/196576
PCT Pub. Date: Sep. 22, 2022

(65) Prior Publication Data
US 2024/0133466 A1 Apr. 25, 2024

(30) Foreign Application Priority Data
Mar. 15, 2021 (JP) .................... 2021-041103

(51) Int. Cl.
*F16H 63/34* (2006.01)
*B60T 7/10* (2006.01)
*B60T 11/04* (2006.01)

(52) U.S. Cl.
CPC ........... *F16H 63/3466* (2013.01); *B60T 7/10* (2013.01); *B60T 11/043* (2013.01); *F16H 63/3491* (2013.01)

(58) Field of Classification Search
CPC .. F16H 63/3491; F16H 63/3466; F16D 51/50; F16D 51/00; B60T 1/06; B60T 7/10; B60T 11/04
See application file for complete search history.

(56) References Cited

U.S. PATENT DOCUMENTS

2006/0172857 A1\* 8/2006 Eavenson ............ B62D 11/006
477/203
2015/0239436 A1 8/2015 Kanai et al.
2020/0114884 A1\* 4/2020 Kawanishi ............ F16D 63/006

FOREIGN PATENT DOCUMENTS

JP UM-S48-020174 Y1 6/1973
JP H07-040809 A 2/1995
(Continued)

OTHER PUBLICATIONS

Patent Cooperation Treaty, International Search Report, Application No. PCT/JP2022/011052, dated May 24, 2022, in 5 pages.
(Continued)

*Primary Examiner* — Lori Wu
(74) *Attorney, Agent, or Firm* — PROCOPIO, CORY, HARGREAVES & SAVITCH LLP

(57) ABSTRACT

An electric parking brake device 10 includes an actuator 16 capable of operating and releasing the center brake 6, a power transmission cable 17 connected to the actuator 16, and a manual operation portion 21. The actuator 16 includes an electric motor, and the center brake 6 of the vehicle 1 can be operated or released by a driving force of the electric motor. The manual operation portion 21 is an operation portion for manually operating the actuator 16 without using the driving force of the electric motor in an emergency or the like when the electric motor stops working. An arrangement position of the manual operation portion 21 is a position that is exposed to the wheel house, and is covered from an outer (Continued)

side in a vehicle width direction by the front wheel 11 in a state where the front wheel is oriented in a straight direction.

2 Claims, 3 Drawing Sheets

(56) References Cited

FOREIGN PATENT DOCUMENTS

| JP | H07-096858 A | 4/1995 |
|----|----|----|
| JP | 2015-004345 A | 1/2015 |
| JP | 2016-150600 A | 8/2016 |
| JP | 2016-151286 A | 8/2016 |
| JP | 2018199364 A * | 12/2018 |
| JP | 2019048587 A * | 3/2019 |
| JP | 2020-002972 A | 1/2020 |
| WO | 2014-049856 A1 | 4/2014 |

OTHER PUBLICATIONS

Patent Cooperation Treaty, WOSA, Application No. PCT/JP2022/011052, dated May 24, 2022, in 3 pages.

* cited by examiner

ELECTRIC PARKING BRAKE DEVICE FOR VEHICLE

TECHNICAL FIELD

The present disclosure relates to an electric parking brake device for a vehicle.

BACKGROUND ART

Patent Literature 1 describes an electric parking brake device to be fixed to a side surface of a side member on a vehicle outer side below a floor panel of a vehicle compartment. The electric parking brake device is a braking device provided in a separate system from a normal braking system by a brake pedal. The electric parking brake device has a function of locking (restraining) rotation of rear wheels by automatically pulling, for example, a friction braking mechanism (a drum brake device, a disc brake device and the like) built in the rear wheels with a wire cable. The electric parking brake device incorporates a battery-driven motor. An operation state of the motor is controlled according to an operation of an occupant. For example, when an operation of rotating the motor in a forward direction is performed, the wire cable is pulled and the rear wheels are locked. When an operation of reversely rotating the motor is performed, a pulling force of the wire cable is weakened, and the lock of the rear wheels is released. These operations are associated with, for example, a button operation, and a depression operation on an accelerator pedal.

CITATION LIST

Patent Literature

Patent Literature 1: JP2016-150600A

SUMMARY OF INVENTION

Technical Problem

In some cases, an electric parking brake device is provided with a manual operation portion for manually operating or releasing the parking brake in an emergency or the like. The manual operation portion is connected to an actuator having an electric motor or the like of the electric parking brake device, and by manually operating the manual operation portion, the actuator can be manually operated to activate or release the parking brake without using a driving force of the electric motor. However, in a vehicle in which an actuator (including a motor) of an electric parking brake device is disposed outside a vehicle compartment as the electric parking brake device described in Patent Literature 1, a manual operation portion connected to the actuator may also be disposed outside a vehicle compartment. In this case, since the manual operation portion is disposed outside the vehicle compartment, there is a possibility that the manual operation portion may be unintentionally operated by another person.

An object of the present disclosure is to provide an electric parking brake device for a vehicle that can prevent a manual operation portion from being unintentionally operated.

Solution to Problem

In order to solve the above problem, according to a first aspect of the present disclosure, there is provided an electric parking brake device for a vehicle in which a steerable front wheel is disposed in a wheel house, the electric parking brake device including an actuator and a manual operation portion. The actuator includes an electric motor and is configured to operate or release a parking brake of the vehicle by a driving force of the electric motor. The manual operation portion is connected to the actuator and is configured to be manually operated to operate the actuator without using a driving force of the electric motor. An arrangement position of the manual operation portion is a position that is exposed to the wheel house, and is covered from an outer side in a vehicle width direction by the front wheel in a state where the vehicle is oriented in a straight direction.

In the above configuration, the arrangement position of the manual operation portion to be manually operated to operate the actuator without using the driving force of the electric motor is a position covered from the outer side in the vehicle width direction by the front wheel in a state where the vehicle is oriented in the straight direction (direction in which the vehicle goes straight forward (or backward)), and the front wheel is disposed in the wheel house. Therefore, in a state in which the front wheel is oriented in the straight direction, it is difficult to access the manual operation portion on an inner side in the vehicle width direction of the front wheel due to both a vehicle body defining the wheel house and the front wheel. Therefore, for example, when the vehicle is parked or the like, the front wheel is oriented in the straight direction to prevent the manual operation portion from being unintentionally operated.

In addition, the manual operation portion is covered from the outer side in the vehicle width direction by the front wheel in a state where the front wheel is oriented in the straight direction, so that visibility of the manual operation portion from the outer side in the vehicle width direction is poor. Therefore, it is possible to prevent the manual operation portion from being unintentionally operated since it is difficult to find the manual operation portion.

In addition, when the front wheel is steered to one side in the left-right direction, one side (the front side or the rear side) in the front-rear direction of the front wheel moves to the outer side in the vehicle width direction, and thus the manual operation portion can be easily accessed from the one side in the front-rear direction of the front wheel into the wheel house on the inner side of the front wheel in the vehicle width direction. Since the arrangement position of the manual operation portion is a position exposed to the wheel house, an operator such as a driver can steer the front wheel to one side in the left-right direction in an emergency or the like to operate the manual operation portion by inserting a hand into the wheel house from the one side in the front-rear direction of the front wheel.

A second aspect of the present disclosure is directed to the electric parking brake device for a vehicle according to the first aspect, in which the manual operation portion is disposed in front of and behind a front-rear position of a center of the front wheel.

In the above configuration, the manual operation portion is disposed in front of and behind the front-rear position of the center of the front wheel, so that the manual operation portion can be easily accessed from the front or rear of the front wheel.

In addition, the manual operation portion is disposed in front of or behind the center of the front wheel, so that by steering the front wheel to one side in the left-right direction, one side (the front side or the rear side) of the front wheel in the front-rear direction can be moved to the outer side in the vehicle width direction to separate the one side of the front wheel from the manual operation portion toward the outer side in the vehicle width direction. Therefore, a space can be secured on the outer side in the vehicle width direction of the manual operation portion (with the front wheel), so that the manual operation portion can be easily operated during operation on the manual operation portion in an emergency or the like.

Advantageous Effects of Invention

According to the present disclosure, the manual operation portion can be prevented from being unintentionally operated.

DESCRIPTION OF EMBODIMENTS

Figure 1:
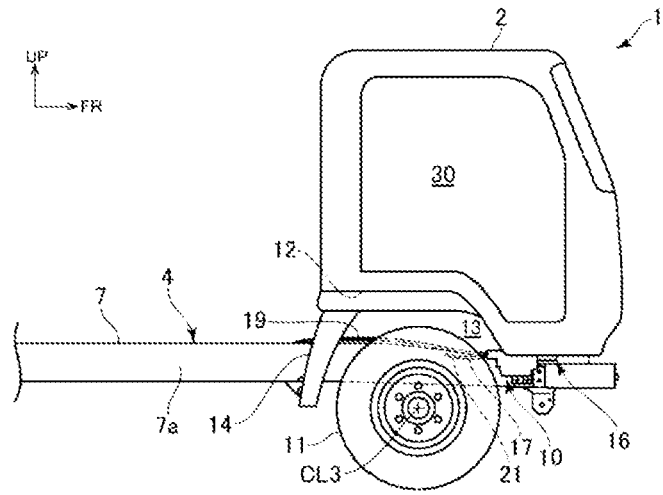
FIG. 1 is a schematic side view of a front portion of a vehicle to which an electric parking brake device according to an embodiment of the present disclosure is applied.

Hereinafter, an embodiment of the present disclosure will be described with reference to the drawings. In the drawings, FR indicates a front side of a vehicle, UP indicates an upper side, and IN indicates an inner side in a vehicle width direction. In the following description, a front-rear direction refers to a front-rear direction of the vehicle, and a left-right direction refers a left-right direction when facing the front side of the vehicle.

Figure 2:
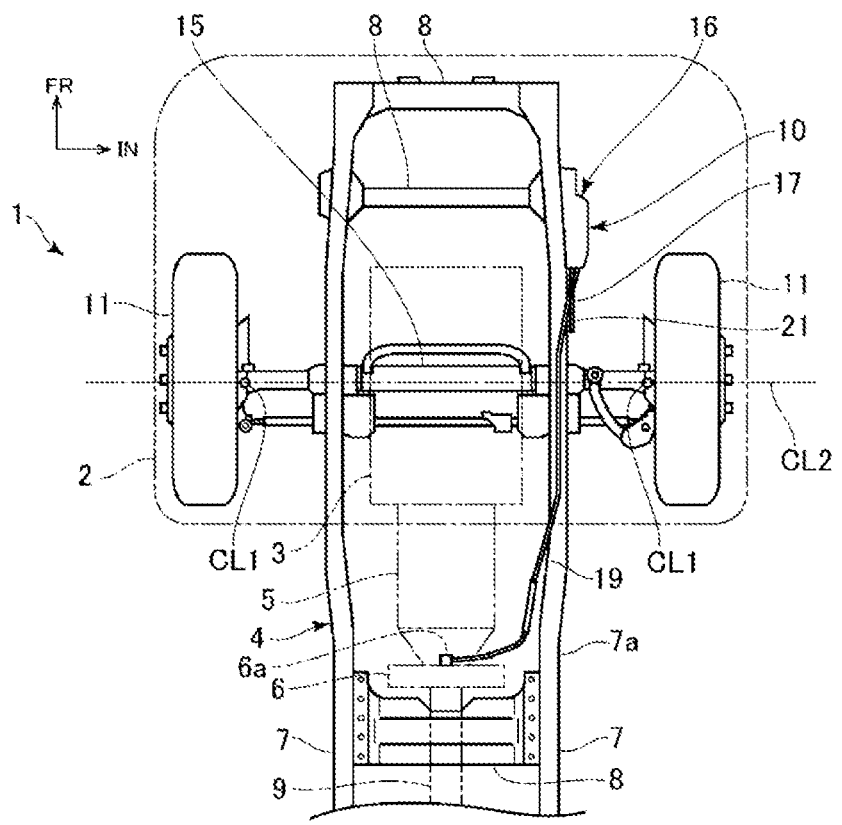
FIG. 2 is a schematic plan view of the front portion of the vehicle.
Figure 3:
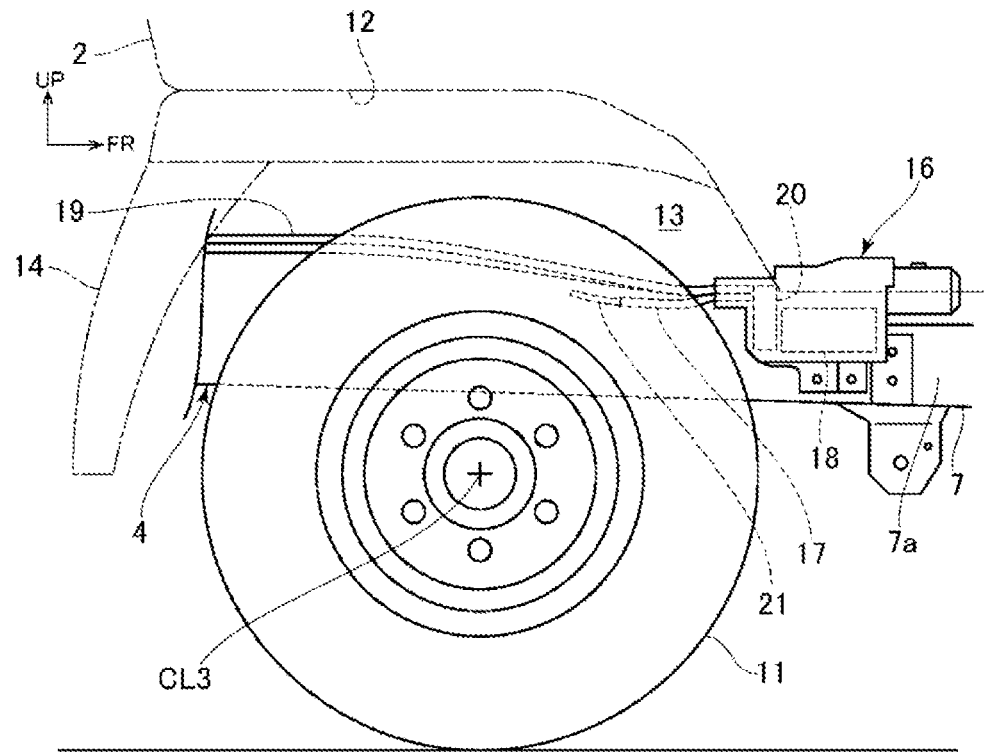
FIG. 3 is a side view of essential parts of the vehicle in FIG. 1.
Figure 4:
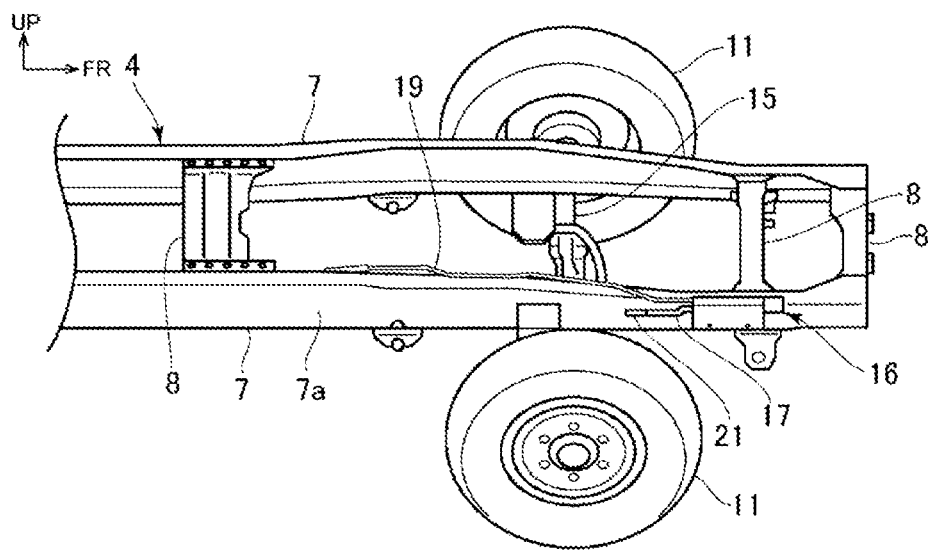
FIG. 4 is a perspective view of the front portion of the vehicle.

As shown in FIGS. 1 and 2, a vehicle 1 to which an electric parking brake device 10 according to the present embodiment is applied is, for example, a cab-over type vehicle 1 in which a cab 2 is disposed substantially above an engine 3, and includes a ladder-shaped vehicle body frame 4 that supports the cab 2 from below.

The vehicle body frame 4 includes left and right side members 7 disposed on both sides in the vehicle width direction of the vehicle 1 and extending in the front-rear direction, and a plurality of cross members 8 extending in the vehicle width direction and connecting the left and right side members 7 to each other. The engine 3, a transmission 5, a center brake (parking brake) 6, a propeller shaft 9, and the like are disposed between the left and right side members 7. The engine 3 is disposed between the left and right side members 7 below the cab 2, and is supported by the left and right side members 7. The transmission 5 is connected to a rear portion of the engine 3, extends from the engine 3 to a rear side than the cab 2, and is supported by the vehicle body frame 4. The center brake 6 is disposed on the rear side than the cab 2, is connected to a rear portion of the transmission 5, and functions as a parking brake of the vehicle 1. The propeller shaft 9 extends rearward from the center brake 6 and transmits a driving force of the engine 3 to a rear wheel (not shown) of the vehicle 1. When the center brake 6 is operated, rotation of the propeller shaft 9 is locked (restricted), and the rear wheel is braked. When the center brake 6 is released, the rotation of the propeller shaft 9 is allowed, and rotation of the rear wheel is allowed.

The cab 2 is disposed above a front portion of the vehicle body frame 4 and is supported by the vehicle body frame 4 from below. In the present embodiment, a lower portion of a front end of the cab 2 is rotatably supported by the vehicle body frame 4 around a rotation axis extending in the vehicle width direction, and a rear end side of the cab 2 can be tilted forward and upward from a non-tilt state (a state illustrated in FIG. 1) supported by the vehicle body frame 4 from below. In the following description, a direction of the cab 2 indicates the direction of the cab 2 in the non-tilt state.

As shown in FIGS. 1 to 5, left and right front wheels 11 are disposed on both left and right sides below the cab 2. The left and right front wheels 11 are disposed at positions spaced outward in the vehicle width direction from the left and right side members 7 of the vehicle body frame 4. A front axle beam 15 is disposed below the vehicle body frame 4 and extends in the vehicle width direction. The front axle beam 15 is attached to the vehicle body frame 4 via an elastic member (not illustrated) such as a plate spring.

The left and right front wheels 11 are attached to left and right end portions of the front axle beam 15 via knuckles (not illustrated) so as to be steerable to the left and right. The knuckles are attached to the left and right end portions of the front axle beam 15 so as to be rotatable about a rotation axis CL1 extending in the upper-lower direction, and hubs (not illustrated) provided outside the knuckles in the vehicle width direction is tiltable in the front-rear direction.

The left and right front wheels 11 are fixed to the hubs and can be steered to the left and right around the rotation axis CL1. In the present embodiment, a center line CL2 of the front axle beam 15 and the rotation axis CL1 of the knuckle are arranged at substantially the same front-rear position when viewed from above. In a state (state illustrated in FIGS. 1 to 4) where the left and right front wheels 11 are oriented in a straight direction of the vehicle 1 (hereinafter simply referred to as "straight direction"), a center (rotation center) CL3 of the left and right front wheels 11 and the rotation axis CL1 of the knuckles are arranged at substantially the same front-rear position when viewed from above.

A region above and in front of the left and right front wheels 11 of a floor panel 12 of the cab 2 defines an upper side and a front side of a wheel house 13 where the left and right front wheels 11 can be disposed. Mud guards 14 are disposed behind the left and right front wheels 11. The mud guards 14 are fixed to lower portions of a left and right end of the cab 2, and partition a rear side of the wheel house 13. The left and right front wheels 11 are disposed in the wheel house 13. The side members 7 are disposed on the inner side of the wheel house 13 in the vehicle width direction and extend in the front-rear direction. An outer side of the wheel house 13 in the vehicle width direction is opened. The inner side of the wheel house 13 in the vehicle width direction is opened toward the side member 7.

The electric parking brake device 10 includes an actuator 16 capable of operating and releasing the center brake 6, a power transmission cable 17 connected to the actuator 16, and a manual operation portion 21.

The actuator 16 is disposed outside the vehicle compartment 30 and fixed to the vehicle body frame 4. In the present embodiment, the actuator 16 is fixed to a region of a vehicle width direction outer surface 7a of the right side member 7 (hereinafter, simply referred to as the "side member 7") in front of the right front wheel 11 (hereinafter, simply referred to as the "front wheel 11").

The actuator 16 is connected to the center brake 6 via a wire cable 19 extending rearward from the actuator 16. That is, one end (front end in the present embodiment) of the wire cable 19 is connected to the actuator 16, and the other end (rear end in the present embodiment) of the wire cable 19 is connected to a lever 6a of the center brake 6. The actuator 16 includes an electric motor 18 and a driving force transmission mechanism 20 that transmits a driving force of the electric motor 18 to the wire cable 19.

The driving force transmission mechanism 20 has, for example, a reduction gear (not illustrated) that can reduce the driving force of the electric motor 18 and transmit the driving force, a conversion gear (not illustrated) that converts the driving force in a rotational direction of the electric motor 18 into a linear direction, and the like. The driving force transmission mechanism 20 is provided between the electric motor 18 and the wire cable 19.

The electric motor 18 is electrically connected to an electric control device (not illustrated), and when an occupant operates a switch (for example, a button provided in an instrument panel, or a parking brake pedal provided at a foot of a driver's seat) (not illustrated) inside the vehicle compartment 30, the electric motor 18 is driven to rotate in response to the operation.

For example, when the occupant operates the switch to operate the center brake 6, the electric motor 18 rotates forward, the wire cable 19 is pulled toward the actuator 16 via the driving force transmission mechanism 20, and the lever 6a of the center brake 6 is pulled to lock the propeller shaft 9. When the occupant operates the switch to release the center brake 6, the electric motor 18 rotates reversely, the wire cable 19 is loosened via the driving force transmission mechanism 20, the lever 6a of the center brake 6 returns to an initial position, and the lock of the propeller shaft 9 is released.

The power transmission cable 17 is a cable for transmitting power from the manual operation portion 21 to the actuator 16, is disposed outside the vehicle compartment 30, and is connected to the actuator 16. One end (front end in the present embodiment) of the power transmission cable 17 is connected to the actuator 16 (in the present embodiment, the driving force transmission mechanism 20), and extends rearward from the actuator 16. The other end (rear end in the present embodiment) of the power transmission cable 17 is disposed at a vehicle width position between the side member 7 and the front wheel 11.

The manual operation portion 21 is an operation portion for manually operating the actuator 16 without using the driving force of the electric motor 18 in an emergency or the like when the electric motor 18 stops working, is provided at a rear end portion of the power transmission cable 17, and is disposed outside the vehicle compartment 30. In the present embodiment, the manual operation portion 21 is formed to be manually rotatable using a predetermined tool.

By manually operating (rotating) the manual operation portion 21, the power transmission cable 17 is rotated, and the actuator 16 (in the present embodiment, the driving force transmission mechanism 20) can be operated. That is, the center brake 6 can be operated or released by manually operating the manual operation portion 21. The manual operation portion 21 is disposed between the side member 7 and the front wheel 11 above and in front of a center CL3 of the front wheel 11 in a state where the front wheel 11 is oriented in the straight direction.

In the present embodiment, the manual operation portion 21 is disposed at a position along the vehicle width direction outer surface 7a of the side member 7 (inner side of the wheel house 13 in the vehicle width direction). The manual operation portion 21 is covered from the outer side in the vehicle width direction by the front wheel 11 in a state where the front wheel 11 is oriented in the straight direction. That is, the arrangement position of the manual operation portion 21 is a position covered from the outer side in the vehicle width direction by the front wheel 11 in a state where the front wheel 11 is oriented in the straight direction.

Figure 5:
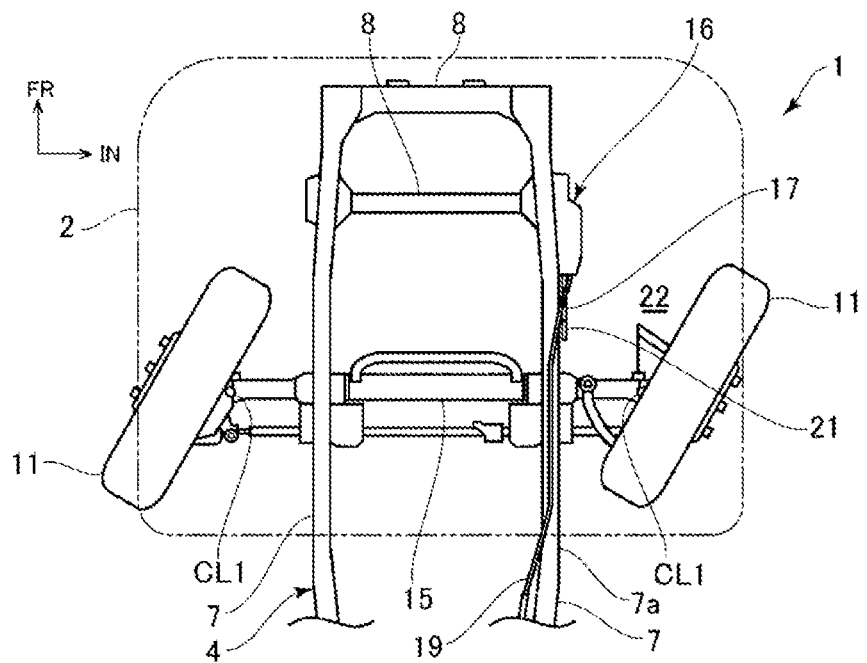
FIG. 5 is a schematic plan view of the front portion of the vehicle in a state where front wheels are steered to a right side.

In the present embodiment, the manual operation portion 21 is disposed at a position that is covered from the outer side in the vehicle width direction by the front wheel 11 not only in a state where the front wheel 11 is oriented in the straight direction, but also in a state where the front wheel 11 is fully steered to one side in the left-right direction (a state illustrated in FIG. 5). The manual operation portion 21 is exposed to the wheel house 13 on the outer side in the vehicle width direction so as to be operated from the wheel house 13.

In the electric parking brake device 10 configured as described above, the front wheels 11 are disposed in the wheel house 13. That is, the front wheels 11 are covered from the front-rear direction and from above by a vehicle body (the cab 2 and the mud guard 14) defining the wheel house 13. Further, the arrangement position of the manual operation portion 21 for manually operating the actuator 16 without using the driving force of the electric motor 18 in an emergency or the like is a position covered from the outer side in the vehicle width direction by the front wheel 11 in a state where the front wheel 11 is oriented in the straight direction. Therefore, in a state where the front wheel 11 is oriented in a straight direction, it is difficult to access the manual operation portion 21 on the inner side in the vehicle width direction of the front wheel 11 due to both the vehicle body defining the wheel house 13 and the front wheel 11, so that the manual operation portion 21 can be prevented from being unintentionally operated.

In addition, the manual operation portion 21 is covered from the outer side in the vehicle width direction by the front wheel 11 in a state where the front wheel 11 is oriented in the straight direction, so that visibility of the manual operation portion 21 from the outer side in the vehicle width direction is poor. Therefore, it is possible to prevent the manual operation portion 21 from being unintentionally operated since it is difficult to find the manual operation portion 21.

Therefore, according to the present embodiment, for example, when the vehicle 1 is parked or the like, the front wheel 11 is oriented in the straight direction to prevent the manual operation portion 21 from being unintentionally operated.

In addition, when the front wheel 11 is steered to one side (the right side in FIG. 5) in the left-right direction, one end (the front end in FIG. 5) in the front-rear direction of the front wheel 11 moves to the outer side in the vehicle width direction, and thus the manual operation portion 21 can be easily accessed from the front side of the front wheel 11 into the wheel house 13 on the inner side of the front wheel 11 in the vehicle width direction.

Since the arrangement position of the manual operation portion 21 is a position exposed to the wheel house 13, an operator such as a driver can steer the front wheel 11 to one side (the right side in the present embodiment) in the left-right direction in an emergency or the like to operate the manual operation portion 21 by inserting a hand into the wheel house 13 from the one side (the front side in the present embodiment) in the front-rear direction of the front wheel 11. Therefore, the operator can operate the manual operation portion 21 with the hand in an emergency or the like to operate or release the center brake 6.

In addition, the manual operation portion 21 is disposed in front of the front-rear position of the center CL3 of the front wheel 11, so that it is easy to access the manual operation portion 21 from the front side of the front wheel 11.

In addition, the manual operation portion 21 is disposed in front of the front-rear position of the center CL3 of the front wheel 11, so that by steering the front wheel 11 to one side (the right side in the present embodiment) in the left-right direction, one side (the front side in the present embodiment) of the front wheel 11 in the front-rear direction can be moved to the outer side in the vehicle width direction to separate a front region of the front wheel 11 from the manual operation portion 21 toward the outer side in the vehicle width direction. Therefore, a large space 22 in the vehicle width direction can be secured on the outer side in the vehicle width direction of the manual operation portion 21 (with the front wheel 11), so that the manual operation portion 21 can be easily operated during operation on the manual operation portion 21 in an emergency or the like.

In addition, the actuator 16 is disposed outside the vehicle compartment 30, so that when the electric motor 18 is driven to operate or release the center brake 6, noise of the electric motor 18 into the vehicle compartment 30 can be reduced.

In addition, both the actuator 16 and the manual operation portion 21 are disposed outside the vehicle compartment 30, so that the power transmission cable 17 between the actuator 16 and the manual operation portion 21 can be shortened.

In addition, both the actuator 16 and the manual operation portion 21 are disposed outside the vehicle compartment 30, so that unlike a case where the actuator 16 is disposed in the vehicle compartment 30, the power transmission cable 17 can be easily routed in the vehicle 1 having the tiltable cab 2.

In the present embodiment, the manual operation portion 21 is disposed in front of the center CL3 of the front wheel 11, but the present disclosure is not limited thereto. For example, the manual operation portion 21 may be disposed behind the center CL3 of the front wheel 11. In this case, it is easy to access the manual operation portion 21 from the rear side of the front wheel 11. Further, by steering the front wheel 11 to one side in the left-right direction, the rear side of the front wheel 11 is moved to the outer side in the vehicle width direction, and a large space in the vehicle width direction can be secured on the outer side in the vehicle width direction of the manual operation portion 21 (with the front wheel 11), so that the manual operation portion 21 can be easily operated during operation on the manual operation portion 21 in an emergency or the like.

Alternatively, the manual operation portion 21 may be disposed at substantially the same front-rear position as the center CL3 of the front wheel 11. In this case, the arrangement position of the manual operation portion 21 is also the position covered from the outer side in the vehicle width direction by the front wheel 11 in a state where the front wheel 11 is oriented in the straight direction, so that in the state where the front wheel 11 is oriented in the straight direction, it is difficult to access the manual operation portion 21 on the inner side of the front wheel 11 in the vehicle width direction, and the visibility of the manual operation portion 21 from the outer side in the vehicle width direction is poor. Therefore, it is possible to prevent the manual operation portion 21 from being unintentionally operated.

In the present embodiment, the actuator 16 is disposed on the right side of the vehicle 1, but the present disclosure is not limited thereto. The actuator 16 may be disposed on the left side of the vehicle 1, or may be disposed at the center in the vehicle width direction. In the present embodiment, the actuator 16 is fixed to the side member 7, but the present disclosure is not limited thereto. For example, the actuator 16 may be fixed to the cross member 8 of the vehicle body frame 4, or may be fixed to another member fixed to the vehicle body frame 4.

In the present embodiment, the power transmission cable 17 extends rearward from the actuator 16, but the present disclosure is not limited thereto. For example, the actuator 16 may be disposed on the rear side of the center CL3 of the front wheel 11, and the power transmission cable 17 may extend forward from the actuator 16.

In the present embodiment, one end of the power transmission cable 17 is connected to the driving force transmission mechanism 20 of the actuator 16, but the present disclosure is not limited thereto. For example, one end of the power transmission cable 17 may be connected to (a shaft of) the electric motor 18 of the actuator 16.

In the present embodiment, the manual operation portion 21 is provided at the end portion of the power transmission cable 17 extending from the actuator 16, but the present disclosure is not limited thereto. For example, the manual operation portion 21 may be provided on a cover of the actuator 16 or the like without providing the power transmission cable 17. Even in this case, the arrangement position of the manual operation portion 21 is also a position covered from the outer side in the vehicle width direction by the front wheel 11 in a state where the front wheel 11 is oriented in the straight direction.

In the present embodiment, the manual operation portion 21 is disposed on the inner side in the vehicle width direction with respect to the wheel house 13 (the position along the vehicle width direction outer surface 7a of the side member 7), and is exposed to the wheel house 13 on the outer side in the vehicle width direction, but the present disclosure is not limited thereto. For example, the manual operation portion 21 may be exposed to the wheel house 13 by being disposed in the wheel house 13.

As described above, the present disclosure has been described based on the above embodiment, but the present disclosure is not limited to the contents of the above embodiment, and can be appropriately modified without departing from the scope of the present disclosure. That is, it is needless to say that other embodiments, examples, operation techniques, and the like that are made by those skilled in the art based on this embodiment are all included in the scope of the present disclosure.

For example, in the above embodiment, the electric parking brake device 10 according to the present disclosure is applied to the cab-over type vehicle 1, but the present disclosure is not limited thereto, and the electric parking brake device 10 may be applied to various other vehicles.

The present application is based on Japanese Patent Application No. 2021-041103 filed on Mar. 15, 2021, the contents of which are incorporated herein by reference.

INDUSTRIAL APPLICABILITY

The electric parking brake device 10 according to the present disclosure can be widely applied to various vehicles.

REFERENCE SIGNS LIST 1 vehicle
6 center brake (parking brake)

10 electric parking brake device
11 front wheel
13 wheel house
16 actuator
18 electric motor
21 manual operation portion

The invention claimed is:

1. An electric parking brake device for a vehicle in which a steerable front wheel is disposed in a wheel house, the electric parking brake device comprising:
   an actuator including an electric motor and configured to operate or release a parking brake of the vehicle by a driving force of the electric motor; and
   a manual operation portion connected to the actuator and configured to be manually operated to operate the actuator without using a driving force of the electric motor,
   wherein an arrangement position of the manual operation portion is a position that is exposed to the wheel house, and is covered from an outer side in a vehicle width direction by the front wheel in a state where the vehicle is oriented in a straight direction.

2. The electric parking brake device for a vehicle according to claim 1,
   wherein the manual operation portion is disposed in front of and behind a front-rear position of a center of the front wheel.

* * * * *